Oct. 20, 1953   J. MARTIN   2,655,998
CONTROL OF VARIABLE PITCH AIRSCREWS FOR AIRCRAFT
Filed March 16, 1951   4 Sheets-Sheet 1

Inventor
JAMES MARTIN
By Worth Wade
Attorney

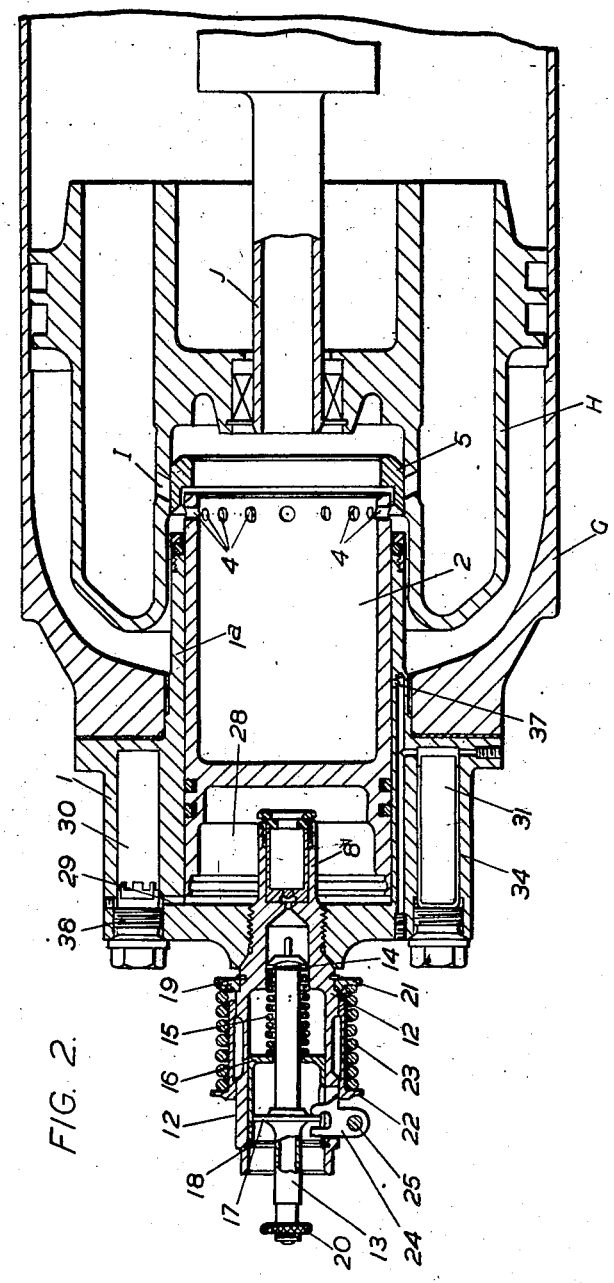

Oct. 20, 1953          J. MARTIN                    2,655,998
         CONTROL OF VARIABLE PITCH AIRSCREWS FOR AIRCRAFT
Filed March 16, 1951                              4 Sheets-Sheet 3
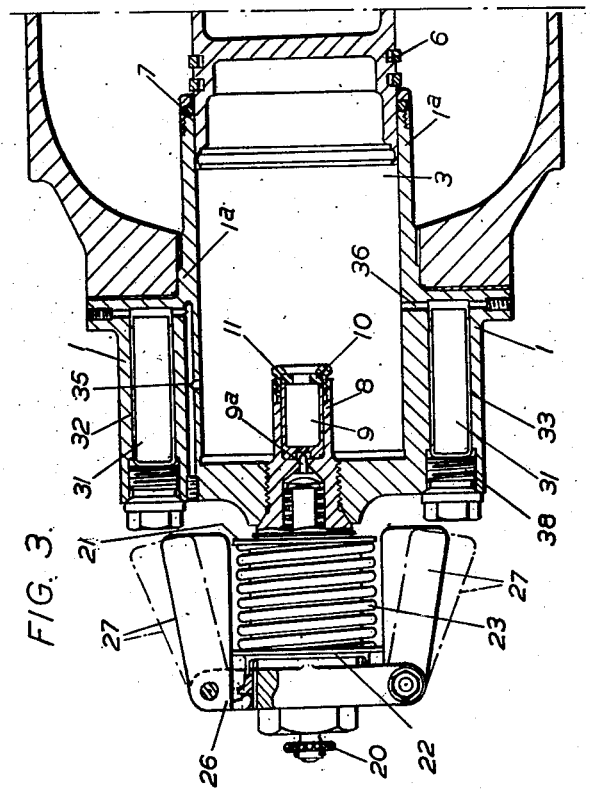
Inventor
JAMES MARTIN
By *Worth Wade*
Attorney

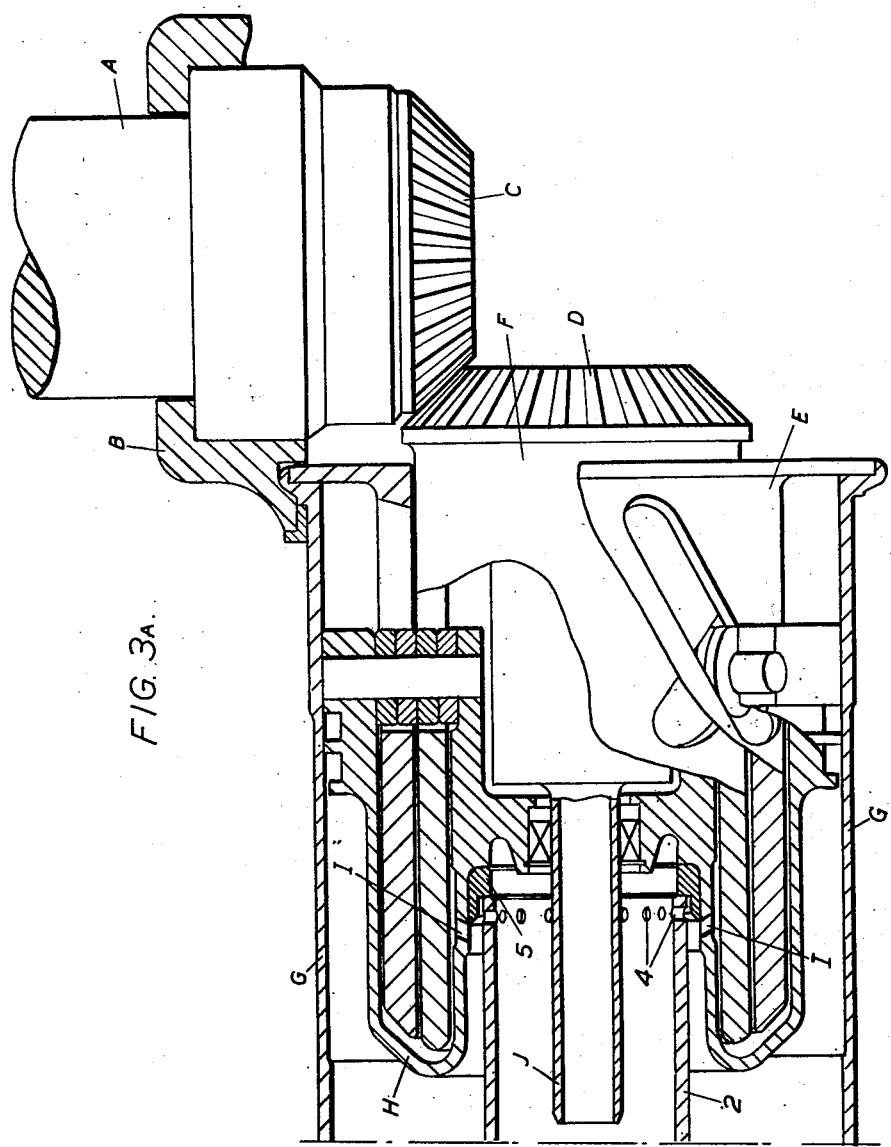

Patented Oct. 20, 1953

2,655,998

UNITED STATES PATENT OFFICE 2,655,998

CONTROL OF VARIABLE PITCH AIRSCREWS FOR AIRCRAFT

James Martin, Higher Denham, near Uxbridge, England

Application March 16, 1951, Serial No. 215,965
In Great Britain May 15, 1950

1 Claim. (Cl. 170—160.21)

The present invention relates to variable pitch airscrews for aircraft of the type utilizing fluid pressure to actuate normally a blade control piston in a fluid chamber mounted in the hub cap of the airscrew to give a range of pitches on the airscrew.

The present invention is directed to supplemental mechanism for an emergency feathering in the event of an engine overspeeding and accordingly there is provided governor means which automatically and rapidly feathers the blades of an airscrew whenever maximum revolutions of the airscrew due to overspeeding of the engine are exceeded. This additional emergency feathering does not affect the normal feathering carried out by the pilot until such time as the maximum revolutions are exceeded when it overrides the conventional normal feathering and once the airscrew blades have reached the feathered position, due to the functioning of the supplemental emergency means, these are locked against any return movement.

According to one feature of the present invention there is provided a supplemental mechanism for feathering the blades of a variable pitch airscrew consisting of a governor responsive to critical revolutions of the propeller, a self-contained source of fluid pressure carried by the airscrew hub, means actuated by the governor when maximum revolutions are exceeded, for releasing, or creating, the fluid pressure, and means actuated by the fluid pressure for setting the blades to the feathered position.

Under this feature of the invention the governor responsive to the critical revolutions serves either to actuate means for releasing the compressed gases in a reservoir, or to fire an explosive charge and create a gas pressure, which actuates means for overriding the normal feathering control of the blades while at the same time setting the blades to the feathered position.

When the blades have been turned to the feathered position means are provided to prevent a return to the unfeathered position until the apparatus is re-set.

Under another feature of the present invention as applied to a form of apparatus in which an explosive charge creates a gas pressure in a cylinder in which an actuating piston works, there is provided a number of explosive charges so arranged along the cylinder as to be ignited consecutively.

The automatic governor referred to hereinafter is of the spring controlled centrifugal type and is designed to be unstable in action, that is to say that until critical revolutions are attained no movement of the governor mechanism takes place, but immediately these revolutions are exceeded the governor weights move and pass through their full travel.

In the construction hereinafter described and illustrated by the drawings the invention is shown applied to a form in which the governor controls the firing of an initiator cartridge, but it is to be understood that the governor may control a release for the compressed gases contained in a reservoir or holder carried by the hub.

The construction described later also includes the provision of a number of explosive charges ranged along the cylinder so as to be ignited consecutively.

Other objects and advantages will be more easily apparent from a consideration of one embodiment of the invention. For this purpose there is shown one form in the drawings accompanying and forming part of the present invention. This form will now be described in detail, illustrating the general principles of the invention, but it is to be understood that this detailed description is not to be taken in a limiting sense, since the scope of the invention is best defined by the appended claims.

In the accompanying drawings:

Fig. 2 is a longitudinal section taken on the line 2—2 of Fig. 1 and through the hub of a variable pitch airscrew for an aeroplane and having the control mechanism embodied in an extended hub cap.

Figure 1:
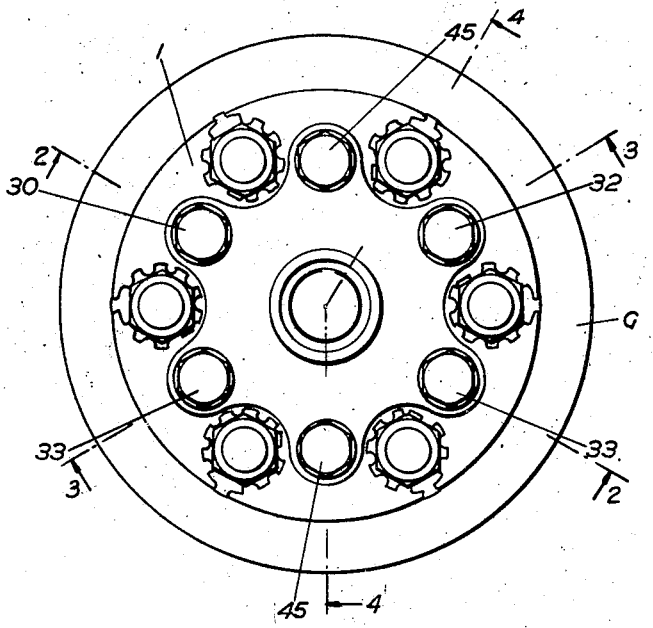
Fig. 1 is an end view of an extended hub cap of the airscrew.
Figure 4:
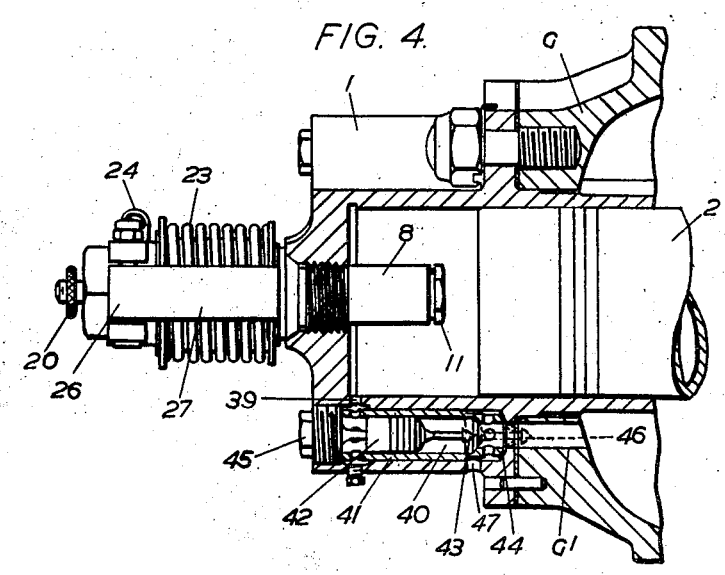

Figs. 3 and 3a constitute a longitudinal section similar to Fig. 2 but taken on the line 3—3 of Fig. 1, and Fig. 4, a longitudinal section on the line 4—4 of Fig. 1.

The conventional pitch changing mechanism is known and not being a part of the invention need not be described in detail, but reference is made to the principal components thereof, some of which co-operate with the improvements or modifications under the invention.

An airscrew blade is designated by A, an airscrew hub by B. C and D are known interengaging bevel gears. A known scissors cam E is attached to hub B and a similar cam F to the bevel gear D. Secured to the hub B is a hub cap G. Within the hub cap G is the normal blade control or feathering piston H. The hub cap G in effect serves as a cylinder for the feathering piston H which slides therein and is moved by oil or other suitable liquid. Ports I and a by-pass valve are provided in the piston H. The range of pitches of the air screw is normally controlled in known manner by manual movement of the piston H which moves the bevel wheels C and D to turn the propeller blade into the desired feathered position.

The hub cap G is extended at 1 and the supplemental control mechanism according to the present invention is housed and carried by this extension 1 having an inwardly projecting part 1a.

The extension 1 and 1a may be formed integral with the cap G or it may be suitably fixed thereto.

Within the extension 1 and 1a is a hollow piston 2, the extension 1 forming a cylinder 3 in which the piston 2 works. The cylinder 3 is an actuating cylinder.

The piston 2, towards its end nearer the normal control mechanism has peripheral ports 4. At the end of the piston 2 is a sleeve 5 which at the appropriate time uncovers the ports I referred to earlier.

The piston has circumferential grooves 6 to receive piston rings. Oil seals 7 are provided on the part 1a.

Mounted at the end wall of the cylinder 3 and projecting thereinto is an initiator cartridge housing 8, the cartridge 9 sealed by a brass disc and rubber washer 10 is held by a retaining nut 11. 9a is the detonator. The housing 8 may be a continuation of a governor body 12.

Within the body 12 is a firing pin 13, having a firing pin head 14 and a firing pin spring 15 bearing against an internal sleeve 16 at one end and the firing pin head 14 at the other end. The firing pin 13 has a bearing flange 17. At one end of the sleeve is an internal circlip 18. An external circlip 19 is provided on the governor body 12. 20 is a knurled knob on the firing pin 13.

On the governor body 12 is a collar 21 and an external sleeve 22. Between the collar 21 and the sleeve 22 is a governor spring 23.

Carried by the body 12 is a governor which becomes effective to release a latch 24, moving about a latch bolt 25 from the sleeve 22, whenever the permitted maximum revolutions of the airscrew are exceeded. The governor 26 shown is of the spring controlled centrifugal type and is designed to be unstable in action, that is to say, until the critical revolutions are attained the governor mechanism does not function to fire the explosive charge, but immediately these revolutions are exceeded the governor weights 27 move through their full travel and firing takes place.

Leading from a chamber 28 formed between the housing 8 and a depression in the head of the piston 2 is a port 29 communicating with a cordite chamber 30 in which is placed a cordite tube 31.

In the example described four cordite chambers are provided numbered respectively 30, 32, 33 and 34.

Leading from the actuating cylinder 3 are ports 35, 36 and 37 communicating respectively with the cordite chambers 32, 33 and 34.

Access to these chambers for loading is by way of openings which are closed by screw closures 38.

The cordite charges are encased in steel tubes 31 with one end sealed. The cordite is a tight fit in these tubes so that it burns on the face only to prolong the combustion time.

Although cordite has been mentioned as the propellant, any other suitable propellant may be used.

The gas from the first cordite charge also enters an oil release chamber port 39. This leads to a chamber 40 which in the installation shown is duplicated formed by a sleeve 41. Within the chamber 40 is a plunger 42 having a pin or point 43. A thin copper disc or washer 44 is secured between a seating and a conical face on the sleeve 41, the assembly being retained by a clamp bolt 45.

On the critical revolutions being attained the governor weights 27 move to the position shown in dotted line in Fig. 3 from the cocked position shown in full line in the same view. This movement depresses the sleeve 22 against the opposing spring 23 and the latch 24 is released. On release of the latch 24 the firing pin 13 is driven forward by its spring 15 and the firing pin head 14 strikes an initiator cartridge percussion cap and the cartridge 9 is fired. The knurled knob 20 is to permit a manual cocking when desired.

The flame from the initiator cartridge passes into the chamber 28, the port 29, and the first cordite chamber 30 and the first cordite charge is fired. The gas from this charge in chamber 30 passes through port 29 into space 28 above the actuating piston 2 which starts to move.

The four cordite charges are arranged to ignite consecutively by porting each chamber at different positions in the actuating cylinder bore. Thus when the lip of the piston uncovers the port 35 leading to the second cordite chamber 32 the flame in the cylinder travels down the port and fires the cordite and the piston is driven further along the cylinder until the third and fourth ports 36 and 37 are in turn uncovered and the cordite in the chambers 33 and 34 fired.

The actuating piston 2 shortly after it commences its stroke drives forward the sleeve 5, thus uncovering exits or ports I in the feathering cap G serving as a cylinder and allowing unfeathering oil in this cylinder to escape from the left to the right of blade control piston H in the cap or cylinder G and thence, together with the feathering oil located between the outside of the cylinder G and the internal wall of the hub B and also within the piston 2 through a pipe G¹, then through a hole 46 and a port 47 to the atmosphere, the hole 46 being made in the copper washer 44 by the plunger pin 43, when the plunger 42 is forced out by the first cordite charge. The oil in the piston 2 passes outwards through the peripheral ports 4.

The piston 2 having displaced the sleeve 5 to clear the oil ports, then drives, through the sleeve, the known blade control piston H and this sets the airscrew blades at the fully feathered position.

When the actuating piston has completed its stroke, means are provided to prevent a return of the blades to the unfeathered position. One way of doing this is by one of the piston rings in the circumferential grooves 6 in the piston 2, which ring expands as it leaves the cylinder barrel and prevents the piston from returning.

The piston 2 has sealing means in order to provide an efficient seal against the high burning gas pressure.

As stated the gas from the first cordite charge enters the oil release chamber 40 and forces the plunger 42 along the sleeve 41 and the plunger tip 43 pierces the closure or washer 44, as indicated in dotted outline in Fig. 4 and releases the oil to atmosphere through a port 47 in the actuating cylinder wall. At the same time the plunger seating comes in contact with a seating on the inside of the sleeve and seals off the gas pressure. More than one oil release chamber may be provided and two are shown in this case.

It is to be understood that the term "self-contained source of fluid pressure" in the claim covers not only a reservoir in which a fluid is stored, but also cases in which the fluid pressure is created by the detonation of an explosive charge.

I claim:

Supplementary automatically actuated mechanism for emergency feathering of the blades of a variable pitch airscrew of the type utilizing fluid pressure to normally actuate a blade-control piston in a fluid chamber mounted in a hub-cap of a variable pitch airscrew, said supplemental mechanism comprising in combination with said airscrew, of an extension on said hub-cap forming a housing, a cylinder mounted in said housing, a hollow piston slidably mounted in said cylinder and forming therewith an enclosed space, a plurality of chambers located radially along the body of said extension for a series of explosive charges, said chambers communicating with said enclosed space, a governor device on said extension responsive to the critical revolutions of the airscrew due to overspeeding of the engine, an initiator cartridge in said cylinder, a firing device for said cartridge, latch means actuated by said governor device on movement thereof for releasing said firing device and firing said initiator cartridge for igniting said explosive charges in said chambers consecutively, the gas pressure on release from each chamber entering into said enclosed space to actuate said hollow piston, a sleeve interposed between said hollow piston and the blade-controlled piston, said sleeve being driven by said hollow piston and uncovering ports in the blade-control piston to release the fluid pressure acting upon the normal blade-control piston, and means for releasing the fluid to atmosphere, said means comprising a release chamber communicating with said enclosed space, a closure at one end of the release chamber and a plunger in the release chamber for piercing said closure, the plunger being moved when the gas pressure from the first gas chamber enters the release chamber.

JAMES MARTIN.

References Cited in the file of this patent

UNITED STATES PATENTS

| Number | Name | Date |
|---|---|---|
| 1,405,643 | Weaver | Feb. 7, 1922 |
| 2,202,813 | Gausmann | June 4, 1940 |
| 2,469,660 | Martin | May 10, 1949 |
| 2,507,671 | May | May 16, 1950 |
| 2,578,350 | Greene | Dec. 11, 1951 |